United States Patent [19]
Pitsch

[11] Patent Number: 6,134,321
[45] Date of Patent: Oct. 17, 2000

[54] MODEM LOOP CURRENT DETECT SYSTEM TO DETECT AN OFF-HOOK CONDITION IN AN EXTENSION TELEPHONE

[75] Inventor: Robert Alan Pitsch, Carmel, Ind.

[73] Assignee: Thomas Licensing S.A., Boulogne, France

[21] Appl. No.: 09/091,314

[22] PCT Filed: Dec. 18, 1996

[86] PCT No.: PCT/US96/20117

§ 371 Date: Jun. 16, 1998

§ 102(e) Date: Jun. 16, 1998

[87] PCT Pub. No.: WO97/23985

PCT Pub. Date: Jul. 3, 1997

Related U.S. Application Data

[60] Provisional application No. 60/009,178, Dec. 22, 1995.

[30] Foreign Application Priority Data

Jan. 2, 1996 [GB] United Kingdom .................... 9600002
Jun. 28, 1996 [GB] United Kingdom .................... 9613608

[51] Int. Cl.$^7$ .................................................. H04M 11/06
[52] U.S. Cl. .................... 379/399; 379/106.08; 379/443; 379/902
[58] Field of Search ............................... 379/399, 22, 23, 379/412, 418, 106.08, 161, 377, 443, 442, 902, 93.05, 93.28

[56] References Cited

U.S. PATENT DOCUMENTS

| | | | |
|---|---|---|---|
| 4,203,006 | 5/1980 | Mascia | 379/443 |
| 4,807,278 | 2/1989 | Ross | 379/184 |
| 4,958,371 | 9/1990 | Damoci et al. | 379/377 |
| 5,291,545 | 3/1994 | Stahl | 379/98 |
| 5,422,939 | 6/1995 | Kramet et al. | 379/106.08 |
| 5,444,772 | 8/1995 | Coker | 379/161 |
| 5,809,109 | 9/1998 | Moyal et al. | 379/22 |

FOREIGN PATENT DOCUMENTS

| | | |
|---|---|---|
| 338654 | of 0000 | European Pat. Off. . |
| 95/14344 | of 0000 | WIPO . |

*Primary Examiner*—Richmond Dorvil
*Attorney, Agent, or Firm*—Joseph S. Tripoli; Robert D. Shedd

[57] ABSTRACT

A telephone line monitoring circuit uses an optoisolator to convert the telephone line current to a voltage which is applied to the input of an AID converter. The A/D values are coarse values representing telephone line current. The A/D is sampled at a predetermined interval to identify changes introduced by the telephone company central office, and to take those changes into account when deciding if an extension telephone has gone off-hook. When a customer causes an extension telephone to go off-hook, the line current divides between the extension telephone and the IRD modem, and such change is detected.

8 Claims, 3 Drawing Sheets

| LOOP CURRENT (MA.) | CURRENT DETECT OUT | TRIGGER POINT |
| --- | --- | --- |
| 16 | 000 | NO VALID POINT |
| 18 | 006 | NO VALID POINT |
| 20 | 026 | 0 |
| 25 | 064 | 2 |
| 30 | 148 | DROP OF >50 |
| 35 | 163 | DROP OF >25 |
| 40 | 175 | DROP OF >25 |
| 45 | 184 | DROP OF >25 |
| 50 | 194 | DROP OF >20 |
| 55 | 196 | DROP OF >20 |
| 60 | 203 | DROP OF >15 |
| 65 | 204 | DROP OF >15 |
| 70 | 208 | DROP OF >15 |
| 75 | 210 | DROP OF >15 |
| 80 | 211 | DROP OF >15 |
| 85 | 215 | DROP OF >15 |
| 90 | 218 | DROP OF >15 |
| 95 | 220 | DROP OF >15 |
| 100 | 212 | DROP OF >15 |
| 105 | 222 | DROP OF >15 |
| 110 | 223 | DROP OF >15 |
| 115 | 224 | DROP OF >15 |
| 120 | 226 | DROP OF >15 |

FIG. 2

MODEM LOOP CURRENT DETECT SYSTEM TO DETECT AN OFF-HOOK CONDITION IN AN EXTENSION TELEPHONE

This application claims benefit of Provisional application Ser. No. 60/009,178 filed Dec. 22, 1995.

The subject invention generally concerns the field of telephone line monitoring circuits.

Modern satellite television systems such as the RCA DSS® system, manufactured by Thomson Consumer Electronics, Inc., Indianapolis, Ind., include circuitry for automatically calling a predetermined telephone number to report the billable specifics regarding the use of the customer's integrated receiver decoder (IRD). Such billing is necessary, of course, because the user receives programming by subscribing to one or more of several program providers. Unfortunately, there is no time of day at which the IRD is guaranteed access to the telephone line, because the user may be placing a call, literally anytime (one cannot schedule emergencies, for example). It is desirable, therefore to be able to detect a condition in which the user picks up an extension phone, in order that the IRD may release the line to the user. However, heretofore the operation of telephone line monitoring circuitry has been somewhat inadequate, due to the drift of the state of the voltage provided by the telephone company. Many factors affect the telephone voltage level delivered to the user's home, such as, the length of the line from the central office, fluctuations in the signals in the line cards used at the central office, whether the connections to the user's home have become corroded, etc. The problem at hand is how to accurately determine if an extension telephone is picked up (causing a perturbation in the line voltage level) given the real world situation wherein changes in line level may be the norm.

Moreover, the measurement is even more complicated by the fact that one cannot reliably measure telephone line voltage at the user's location with respect to the user's ground reference without risking the introduction of ground loop voltages. It also must be noted that because devices coupled to telephone networks are required to have a relatively high input impedance, they tend to be susceptible to picking up noise transients, which may interfere with the measurement of the telephone line level.

European Patent Application No. 0 338 654 discloses a method and apparatus for use in an automatic telecommunication system for controlling communication by a modem over a telephone line. Means are provided for determining prior to initiating communication by the modem over the telephone line whether a telephone connected to the telephone line is off hook and for inhibiting communication by the modem over the telephone line if a telephone is off hook. The same means or further means are arranged for determining during communication by the modem over the telephone line whether a telephone connected to the telephone line goes off hook and for terminating such communication if a telephone goes off hook so as to release the telephone line for use by the telephone.

International Patent Application No. WO 95/14344 discloses a telephone line monitoring circuit for a MODEM monitors the TIP and RING lines of the telephone line. A first connecting circuit detects when a local phone goes off-hook while the MODEM is on-hook by sensing a decrease in a differential voltage between the TIP and RING lines. A second circuit detects the pick up of a local phone while the MODEM is off-hook by detecting a change in the impedance between the TIP and RING lines. A third circuit detects the hang up of a remote phone connected with the MODEM while the MODEM is off-hook by detecting a temporary break in the DC loop between the central office and MODEM. A snoop circuit monitors the telephone line for DTMF signals while the MODEM is on-hook.

SUMMARY OF THE INVENTION

A telephone line monitoring circuit uses a converting device such as an optoisolator to convert the telephone line current to a voltage which is applied to the input of an A/D converter. The A/D values are coarse values representing telephone line current. The A/D is sampled at a predetermined interval to identify changes introduced by the telephone company central office, and to take those changes into account when deciding if an extension telephone has gone off-hook. When a customer causes an extension telephone to go off-hook, the line current divides between the extension telephone and the IRD modem, and such change is detected.

BRIEF DESCRIPTION OF THE DRAWINGS

FIG. 2 shows a table of line current values and A/D readings useful in understanding the invention.

A telephone line monitoring circuit having the capability to detect extension phone pick-up will now be described with reference to the FIGURES.

DETAILED DESCRIPTION OF THE INVENTION

Figure 1:
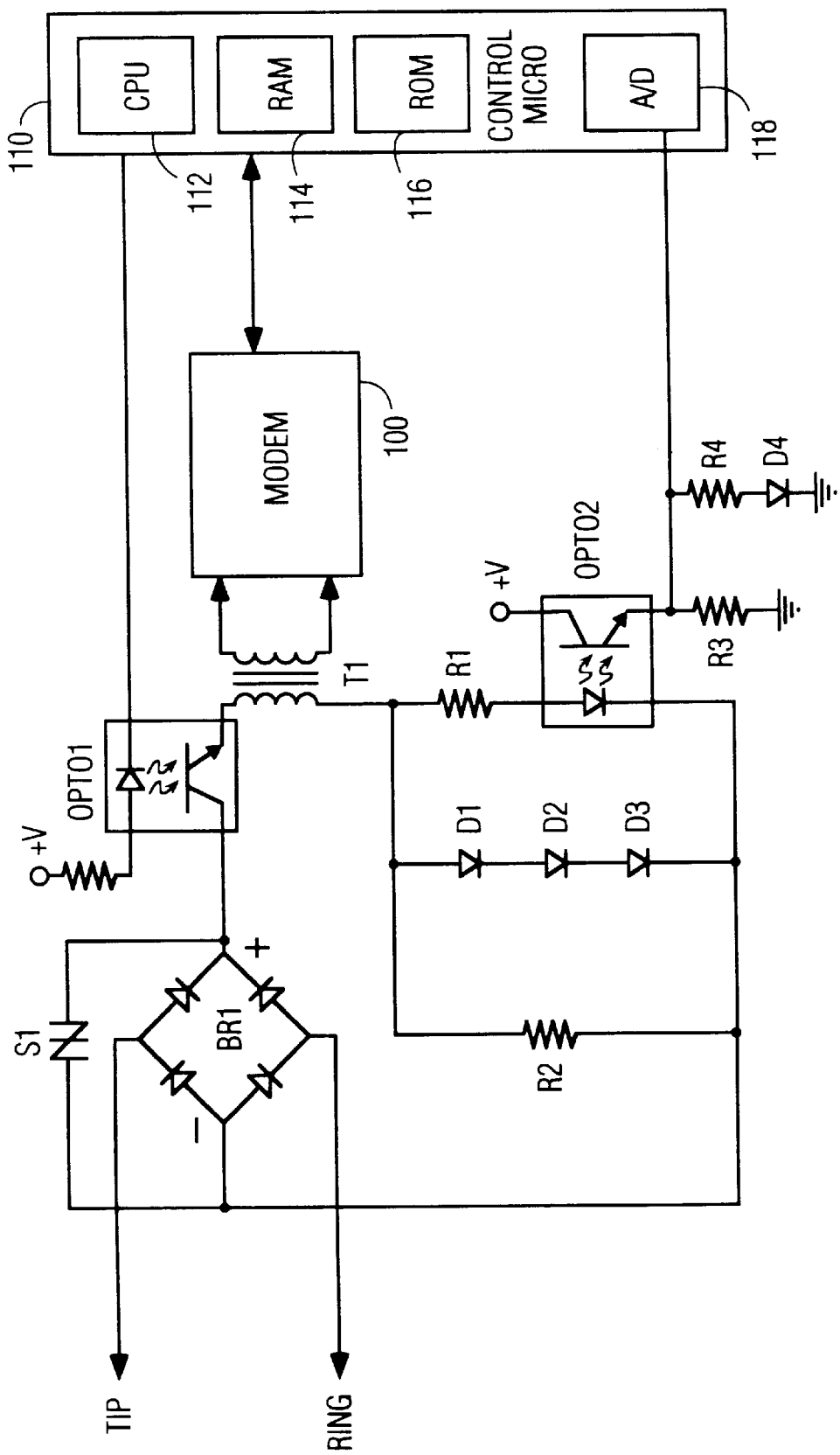
FIG. 1 shows telephone line monitoring circuitry suitable for use with the invention.

Referring to FIG. 1, a diode bridge arrangement BR1 is coupled to a telephone network (not shown), via TIP and RING terminals, for providing communication to and from consumer electronics equipment, the relevant portions of which are illustrated in FIG. 1. A Sidactor®, manufactured by TECCOR Inc., (a bidirectional diac) S1 is coupled across the plus and minus terminals of bridge BR1 to protect the circuitry further coupled to the bridge. Briefly, a Sidactor® is a protection device having an operational characteristic such that, after a breakover voltage is achieved, as the current through the device goes up, its impedance goes down. Its function in the arrangement of FIG. 1 is to limit the voltage developed across OPTO 1. OPTO1 is a darlington optoisolator, and is used as an electronic equivalent of a "hook-switch" for connecting the equipment to the telephone network for placing a call. OPTO 1 operates under control of a system control microcomputer ($\mu$C) 110. The terms "microcomputer", controller, and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 includes a central processing unit (CPU) 112, a program memory (ROM) 116, and stores short term data in a random-access memory (RAM) 114. RAM 114 may be either internal to, or external to, microprocessor 110, and may be of either the volatile or nonvolatile type. The term "RAM" is also intended to include electrically-erasable programmable read only memory (EEPROM). One skilled in the art will recognize that if volatile memory is utilized, that it may be desirable to use a suitable form of standby power (such as from a backup battery) to preserve its contents during power outages.

Optoisolator OPTO1 couples signals to and from a modem 100 via an isolation transformer T1. The telephone company loop current present in the primary winding of transformer T1 is also applied via a resistor R1 to a second optoisolator OPTO2. OPTO2 converts the loop current into an output voltage developed across its emitter resistor R3. The output voltage is applied across an arrangement comprising resistor R4 and diode D4, and is also applied to the input of an A/D converter 118 included within microcomputer 110. One skilled in the art will noted that A/D converter 118 may also be located outside of microcomputer 110, and coupled thereto. The arrangement of resistor R4 and diode D4 is interesting in that resistor R4 is decoupled from the circuit until the forward voltage of diode D4 is met. At that point resistors R3 and R4 are essentially in parallel.

As noted earlier, one cannot count on the line voltage provided by the telephone company to be any particular value. In fact, it may cover a wide range of values. In addition, the line monitoring circuitry must be designed to ensure proper operation at the central office under all conditions. One constraint applied to this design is that the circuitry must present an impedance to the telephone network of no more than 300 ohms at 20 milliamps (ma) DC. Another way to phrase this requirement is that the input impedance be such that it develops no more than 6 volts across it at a current of 20 ma. A series connection of diodes D1, D2, D3, is connected across resistor R1 and optoisolator OPTO2. Diodes D1, D2, and D3 limit the voltage across OPTO2 to a value which ensures that OPTO2 will not be destroyed under high telephone line voltage conditions. The voltage drop across diodes D1, D2, and D3 changes in accordance with the current through them. Resistor R2 serves to lower the voltage across the series connection of diodes D1, D2, and D3 during low current (i.e., 20 ma) operation. This ensures proper operation of central office pulse dialing under low current conditions.

In operation, the telephone line loop current is continually monitored at regular intervals. The current detector (optoisolator OPTO2) supplies a signal to A/D converter 118 which represents the level of current passing through the loop. If the current drops in a significant manner, controller 110 determines that the subscriber's extension telephone was picked up, and the controller hangs up so as not to interfere with the user's phone call.

FIG. 2 shows a table of values of loop current and corresponding carrier detector output voltages, and the recommended trigger point for making the decision as to whether or not an extension phone was picked up. It should be noted that if the loop current is relatively low (18 ma or less) then detection of extension pickup by monitoring the voltage becomes unreliable. However, the Federal Communications Commission (FCC) has specified the minimum long loop current to be provided by the telephone service provider to be 23 ma. As one can readily see from the table of FIG. 1, the circuit of FIG. 1 still provides a reliable trigger point with a loop current of as little as 20 ma (3 ma below the minimum allowable current). It is also noted that the current provided by the telephone company can be as high as 120 ma. The subject invention uses this recognition to provide a plurality of "trigger points" (specific voltage levels) which accommodate this wide range in order to reliably indicate that an extension phone has been picked up.

Figure 3:
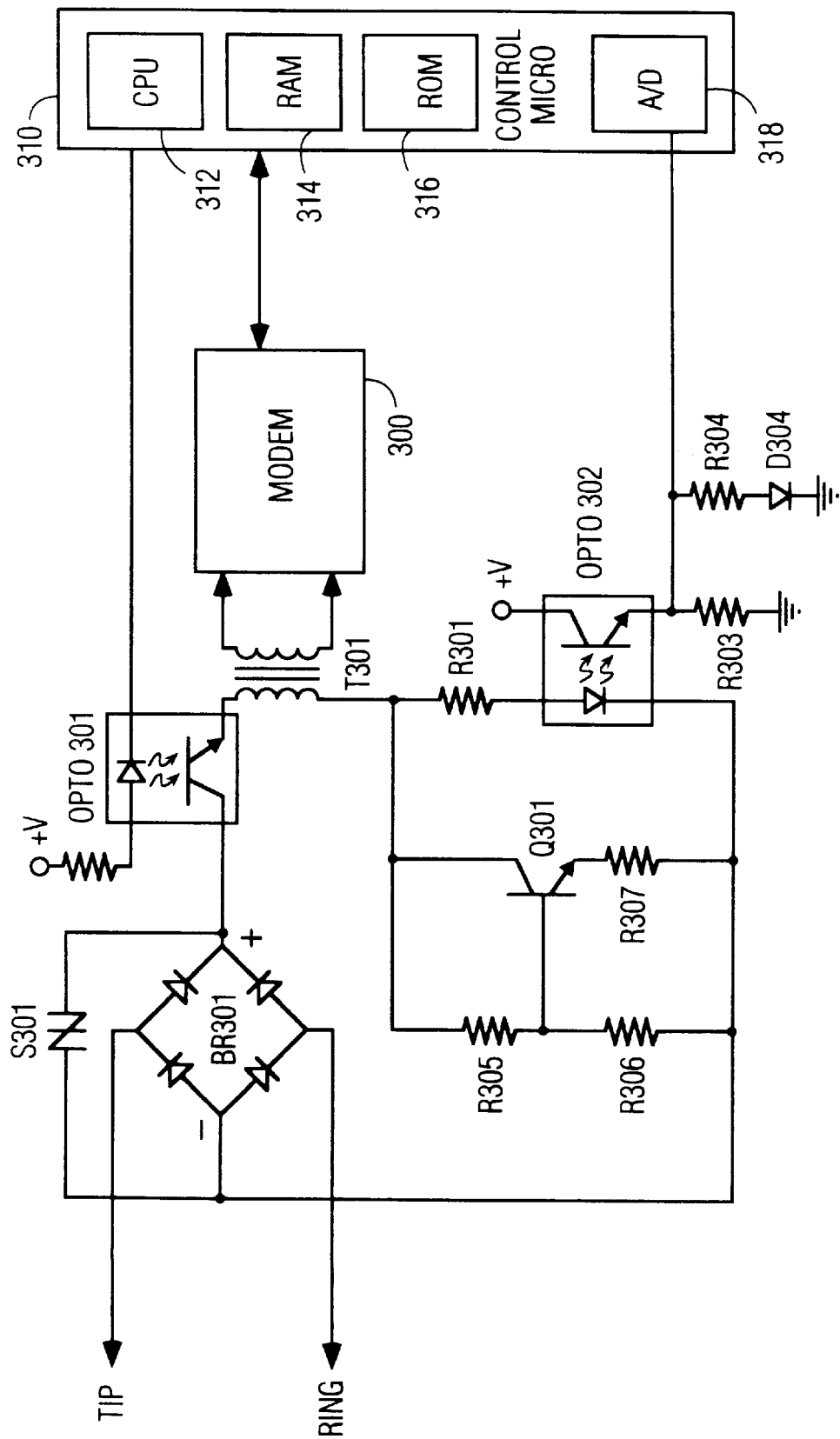
FIG. 3 shows an alternate embodiment of a telephone line monitoring circuit in accordance with the invention.

FIG. 3 shows an alternate embodiment of the invention in which diodes D1, D2, and D3, and resistor R2, have been replaced by a transistor arrangement comprising transistor Q301, and resistors R305, R306, and R307. It is felt that the transistor arrangement may provide a more linear conversion of telephone line current to output voltage, but perhaps at the expense of slightly higher cost.

R301 (and R1 of FIG. 1) is preferably 560 ohms. R303 (and R3) is preferably 15 kilohms. R304 (and R4) is preferably 1.5 kilohms. A typical value for resistor R305 and resistor R306 (and for R2 of FIG. 1) is 68 ohms. This value is important in that if a relatively higher resistance value is chosen, then a voltage will be developed which is greater than the previously mentioned 6 volts at 20 ma input current. Emitter resistor R307 is preferably 7.5 ohms. Q301 may be a commonly-available 2N3904 transistor.

What is claimed is:

1. A telephone line monitoring circuit, comprising:

telephone line connection means for coupling signals to and from a telephone network;

modem means for communicating with said telephone network via said connection means;

a control means for providing control signals;

converting means for converting telephone line current supplied to said modem means to a voltage proportional to said current;

A/D converter means for sampling said voltage and providing digital samples to said control means;

wherein said control means monitors said samples from said A/D converter means and determines from a deviation between consecutive readings if an extension telephone coupled to said telephone line is off-hook.

2. The circuit of claim 1, wherein said converter means (OPTO2) is an optoisolator means.

3. The circuit of claim 2, further including voltage limiting means (D1, D2, D3) connected across said optoisolator means for limiting voltage developed across said optoisolator means.

4. The circuit of claim 3, wherein said voltage limiting means (D1, D2, D3) comprises a plurality of series-connected diodes.

5. The circuit of claim 4, further including resistor means (R1) connected across said voltage limiting means (D1, D2, D3) and said optoisolator means (OPTO2) for limiting voltage developed across said diode means (D1, D2, D3) during low current operation.

6. The circuit of claim 5, further including switch hook (OPTO 1) means under control of said control means (110) for establishing a connection to said telephone network.

7. The circuit of claim 3, wherein said voltage limiting means comprises an arrangement comprising a transistor means (Q301) and a resistor means (R305, R306, R307) wherein said resistor means (R305, R306, R307) and a main conduction path of said transistor means (Q301) are coupled in series, and are connected in parallel with said optoisolator means (OPTO2).

8. The circuit of claim 7, further including switch hook means (OPTO1) under control of said control means (110) for establishing a connection to said telephone network.

* * * * *

UNITED STATES PATENT AND TRADEMARK OFFICE
CERTIFICATE OF CORRECTION

PATENT NO  : 6,134,321
DATED      : October 17, 2000
INVENTOR(S): Robert Alan Pitsch It is certified that error appears in the above-identified patent and that said Letters Patent is hereby corrected as shown below:

On the front page under Assignee:

Delete the word "Thomas" and substitute with --Thomson--.

Signed and Sealed this

Twenty-second Day of May, 2001

*Attest:*

NICHOLAS P. GODICI

*Attesting Officer*   *Acting Director of the United States Patent and Trademark Office*